United States Patent [19]

Hörvallius

[11] Patent Number: 4,823,470
[45] Date of Patent: Apr. 25, 1989

[54] METHOD AND ARRANGEMENT FOR THE MEASUREMENT OF WHEEL ALIGNMENT ANGLES IN THE FRONT AXLE AND SUSPENSION ASSEMBLY OF A MOTOR VEHICLE

[76] Inventor: Torgny Hörvallius, Skogsslingan 13, S-803 59 Gävle, Sweden

[21] Appl. No.: 100,244

[22] Filed: Sep. 23, 1987

[30] Foreign Application Priority Data

Oct. 1, 1986 [SE] Sweden ............................ 8604173

[51] Int. Cl.$^4$ ............................................ G01B 11/275
[52] U.S. Cl. ........................................ 33/228; 33/288; 356/155
[58] Field of Search ................... 33/288, 228; 356/155

[56] References Cited

U.S. PATENT DOCUMENTS

| 2,249,226 | 7/1941 | Peters ................................... 33/288 |
| 3,029,515 | 3/1956 | Marteil . |
| 3,409,990 | 11/1968 | Vorpahl ............................ 33/288 X |
| 4,011,659 | 4/1975 | Hoervallius . |
| 4,015,339 | 11/1975 | Hoervallius . |
| 4,135,823 | 7/1976 | Hoervallius . |
| 4,303,338 | 12/1981 | Morrison et al. ................. 33/288 X |
| 4,440,495 | 4/1984 | Bergstrom et al. . |
| 4,630,379 | 12/1986 | Wickmann et al. ................... 33/288 |

Primary Examiner—William D. Martin, Jr.
Attorney, Agent, or Firm—Flynn, Thiel, Boutell & Tanis

[57] ABSTRACT

Proposed in accordance with the invention is a method of measuring the camber, KPI and caster wheel alignment angles in the front axle and suspension assembly of a motor vehicle without the need for recourse to a levelled surface or to any gravitation-sensing instruments for the purpose of the measurements. One front wheel at a time is measured, for which purpose the wheel is fitted with a projecting pin parallel to the wheel axle intended to support a laser beam machine which emits a beam perpendicular to the wheel axle. A screen marked with reference lines is positioned at a certain distance away from the wheel, initially in front of, and then alongside the wheel, with the direction of the reference lines corresponding to the direction of the reference plane of the vehicle. By causing the laser to rotate about the pin, and by causing the wheel to execute steering movements with the laser fixed to the pin, the laser beam can be made to "draw" lines on the screen, which lines produce angles with the reference lines of the screen in accordance with the camber, KPI and caster angles of the wheel. In order to be able to carry out the measurements rapidly and accurately, and at the same time to have the results of measurement recorded, the use of a special design of the aforementioned screen is proposed, more specifically in the form of a measurement panel (60) equipped with a pointer (80), to which panel a sheet of paper bearing a scale (90) can be secured. The results of measurement are recorded on this automatically by the operator making a mark with a pen in an opening (81) in the pointer (82) after every measurement adjustment.

20 Claims, 9 Drawing Sheets

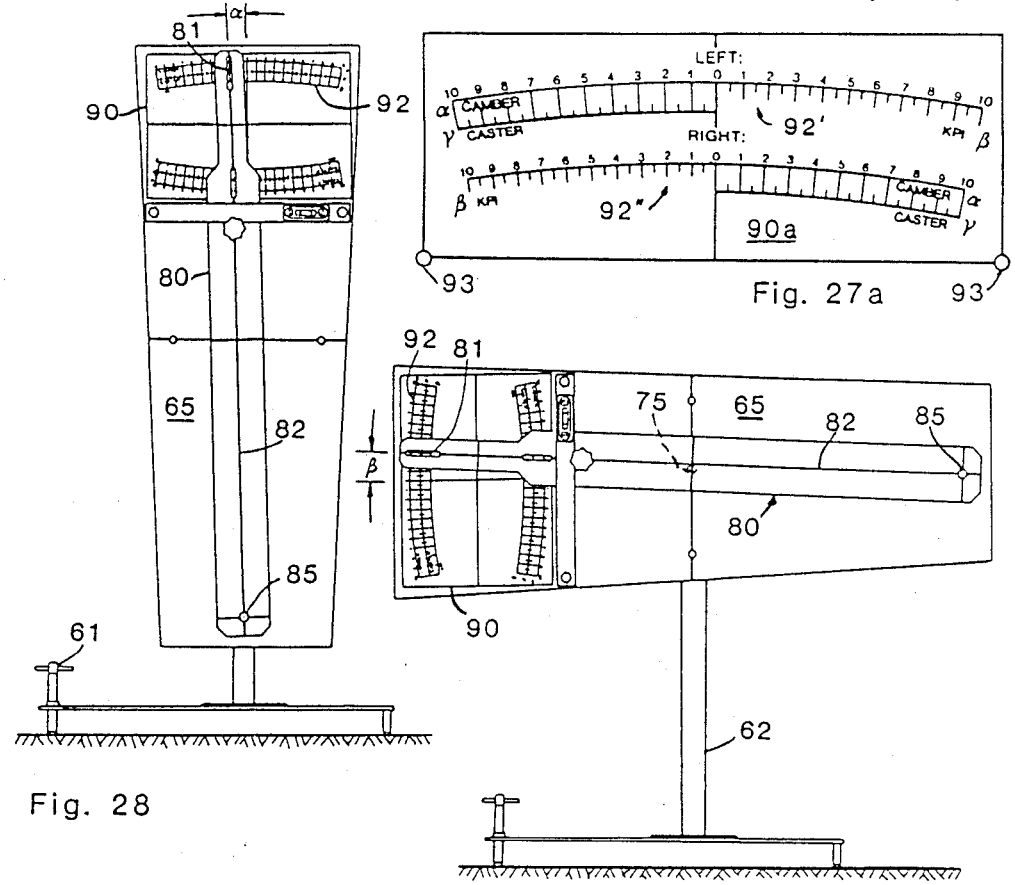
Fig. 28
Fig. 27a
Fig. 29
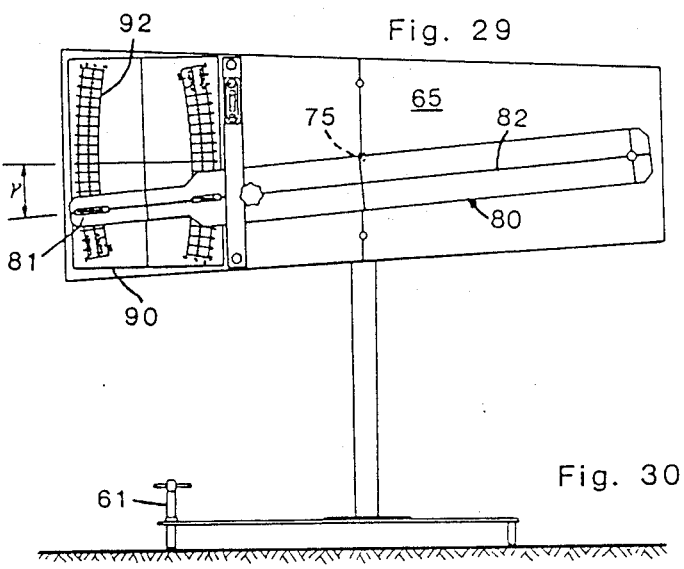
Fig. 30

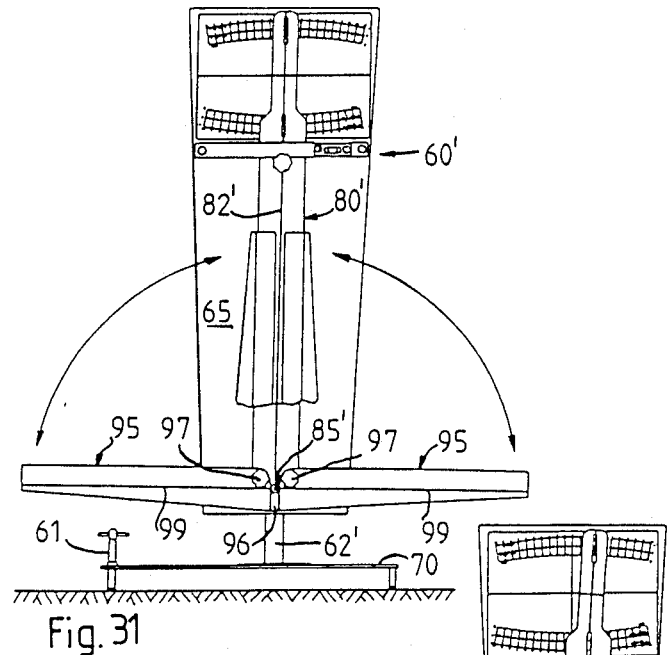
Fig. 31
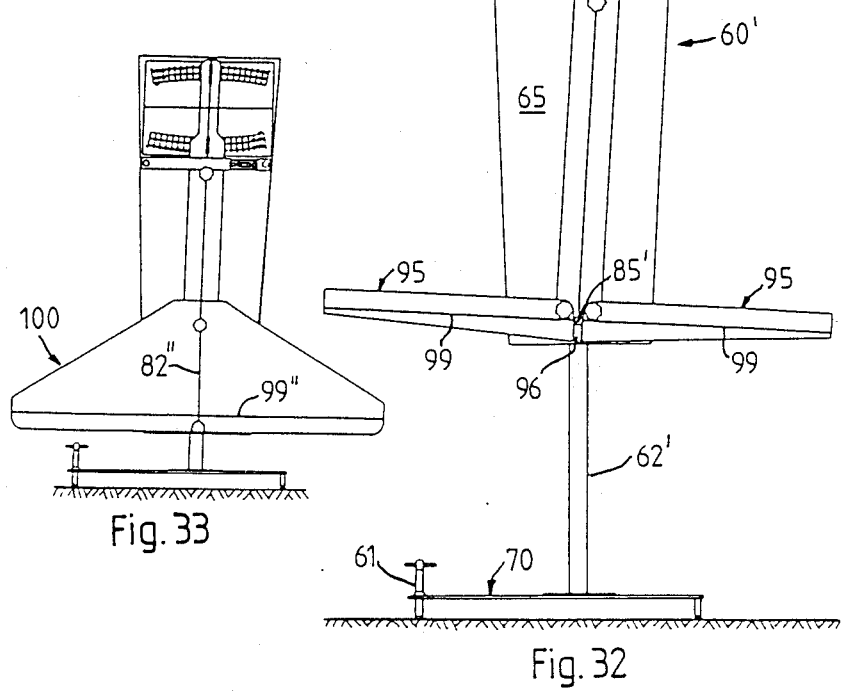
Fig. 33
Fig. 32

METHOD AND ARRANGEMENT FOR THE MEASUREMENT OF WHEEL ALIGNMENT ANGLES IN THE FRONT AXLE AND SUSPENSION ASSEMBLY OF A MOTOR VEHICLE

The present invention relates to a method and an arrangement for determining the manner in which the wheels are adjusted in the front axle and suspension assembly of a motor vehicle and the manner in which they turn during steering. The question with which we are concerned here is nothing more than one of the measurement of angles.

It was discovered at a very early date, when the very first steerable motor vehicles appeared, that the adjustment of the front wheels and the manner in which they turn for steering purposes was a highly intricate question and one of considerable significance to the function of the vehicle. Whereas it proved possible without major problems for the driving rear wheels to be mounted in fixed positions, for example parallel to one another and with coaxial axes, and whereas all that was necessary was to provide for their individual driving (via a differential), the adjustment of the front wheels was an entirely different matter. It was found that they should not at all adopt a parallel and coaxial attitude in their initial position or neutral position, but that they should be inclined somewhat or "stand at an angle" when viewed in different planes, and also that they should not turn about any parallel or vertical axes during steering, but that these axes, too, should be inclined in various ways. These known relationships and the designations applied in this context to the angles concerned, etc., are summarized below.

As will already have been appreciated, it is of the greatest importance to the function of the vehicle, and thus to its driving safety and driving comfort, for the front wheels to be correctly adjusted and for them to move in the correct manner during steering, that is to say for the so-called steering geometry to be correct. It is important for this reason for the adjustment of the front axle and suspension assembly to be capable of being checked, that is to say for the angles concerned to be measured in order to establish that they fall within the stipulated, and rather narrow limits. In particular after the vehicle has been repaired after having suffered accident damage, for example, when the front axle and suspension assembly is often most exposed, it is important to check that the front wheels run and steer correctly, and to verify that the normal alignment has been restored.

The problem, however, which will be seen immediately by any engineer, is that this angle checking cannot be a simple procedure. The question which arises is one of the measurement of small angles which require to be measured in moving systems in the absence of easily accessible reference points, reference axes or reference surfaces. The various kinds of measurement equipment which are available at the present time for this special purpose are also extremely complicated and expensive. This applies not only to the apparatus itself, which, if it is to function reliably, also requires access to an even, "levelled" surface on which the vehicle can be positioned during measurement. The expression levelled surface is intended to denote simply that the surface is horizontal in the true sense, that is to say that it extends in a sense perpendicular to the direction of the gravitational force. The reason why a surface of this kind is required for the measurements is that the previously disclosed methods of measurement are based on what may be referred to as geodetric principles, that is to say instruments of a previously disclosed kind which sense the direction of the gravitational force are used for the measurements, such as levelling instruments of various kinds ranging from levels ("spirit levels") to plumb lines.

Experts in the area of the servicing of motor vehicles are familiar with the fact that measurements of the front axle and suspension, assembly, although necessary, are time-consuming and complicated and call for expensive apparatus, and thus belong to the more costly measurement and checking operations in this field of technology.

The object of the invention is thus to make available a simplified procedure for executing these measurements on the front axle and suspension assembly rapidly and without the need for highly trained personnel, and yet obtaining measurement results which, with regard to their accuracy, actually exceed those obtained by the previously disclosed methods. The principal advantage gained from the invention is that the requirement for a special parking place with a levelled floor area for performing the measurements is no longer applicable, and the measurements can accordingly be performed at any location in the workshop premises, thanks to the fact that no gravitation-dependent measuring instruments are needed for the execution of the invention.

In order to carry out measurements of the front axle and suspension assembly in the manner proposed in accordance with the invention, a number of mechanically simple components are required, some of which are entirely novel and are executed in accordance with the invention, whereas others are previously disclosed, especially the so-called centring instrument which is described in, amongst others, U.S. Pat. No. 4,011,659.

The object of the invention is achieved, and a novel, simplified system for the measurement of wheel alignment angles in the front axle and suspension assembly of a motor vehicle is achieved through the procedure in accordance with the invention being applied in the manner defined in the characterizing part of patent claim 1. An important component part for the implementation of the invention is described in the characterizing part of patent claim 5.

The invention is now described for the purpose of exemplification with reference to the accompanying drawings, in which FIGS. 1-2 schematically illustrate three of the front axle and suspension assembly angles involved in the measurement procedure in accordance with the invention, whilst FIG. 3 illustrates in the interests of completeness a fourth angle of the front axle and suspension assembly, the measurement of which falls outside the scope of the invention.

Figure 17:
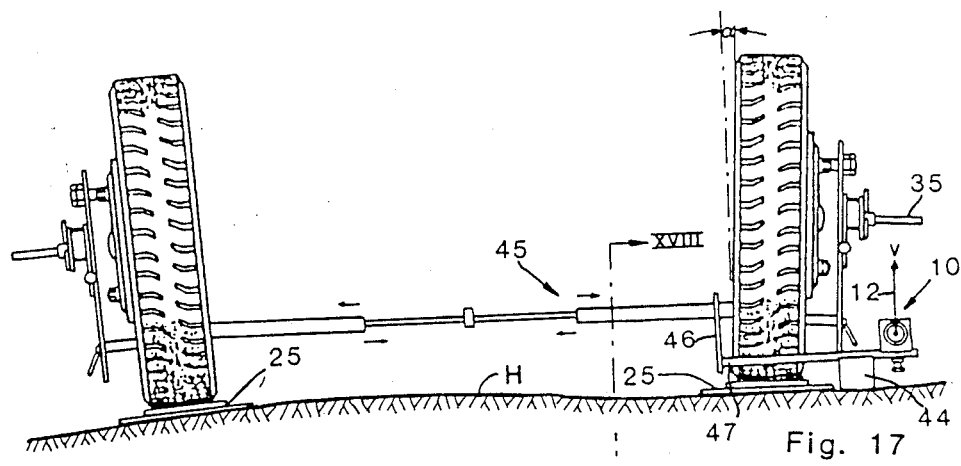
Figure 18:
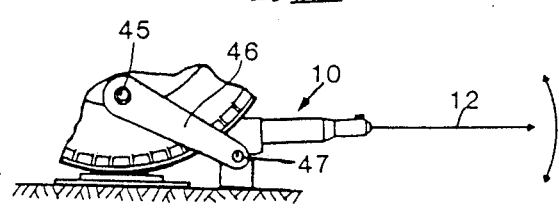

FIG. 17 and FIG. 18 (a detailed view from the plane marked with the line XVIII—XVIII in FIG. 17) illustrate a method and an arrangement for directing a laser in accordance with the invention so that its beam sweeps in a plane which is parallel to the vertical plane of symmetry of the vehicle, in conjunction with which adjustment takes place entirely independently of the form or inclination of the base on which the vehicle is standing.

Figure 19:
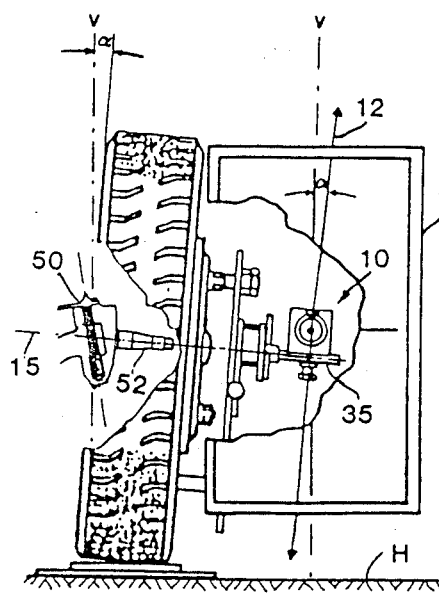
Figure 20:
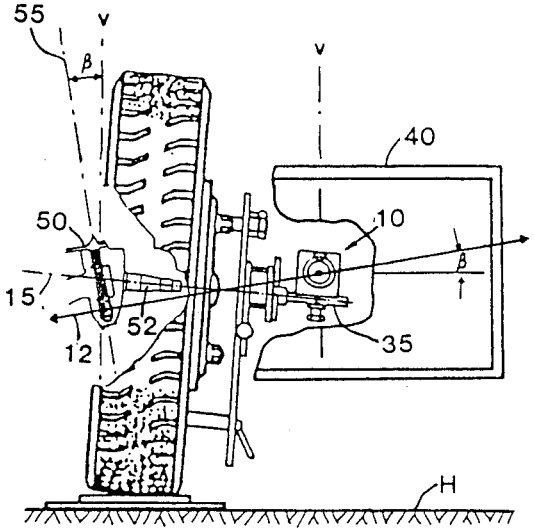

FIG. 19 illustrates additionally the manner in which the camber angle of a front wheel is measured in accordance with the invention, whereas FIG. 20 similarly illustrates the manner in which the so-called KPI angle of the wheel is measured.

Figure 21:
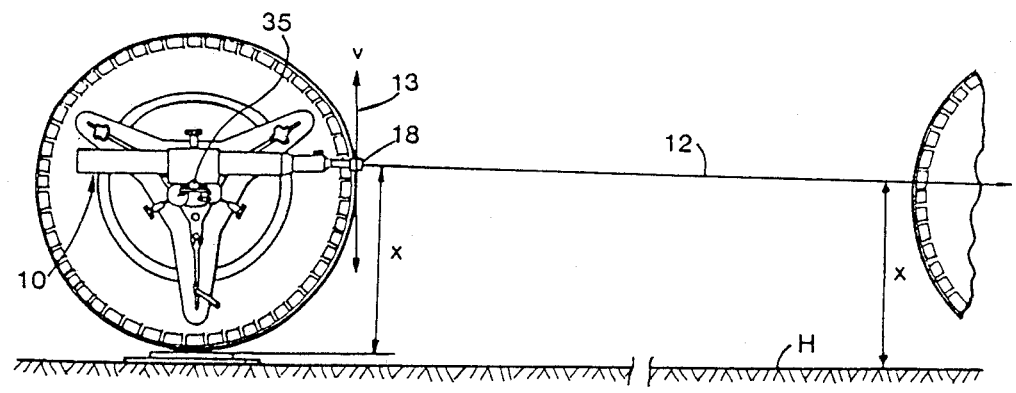
Figure 22:
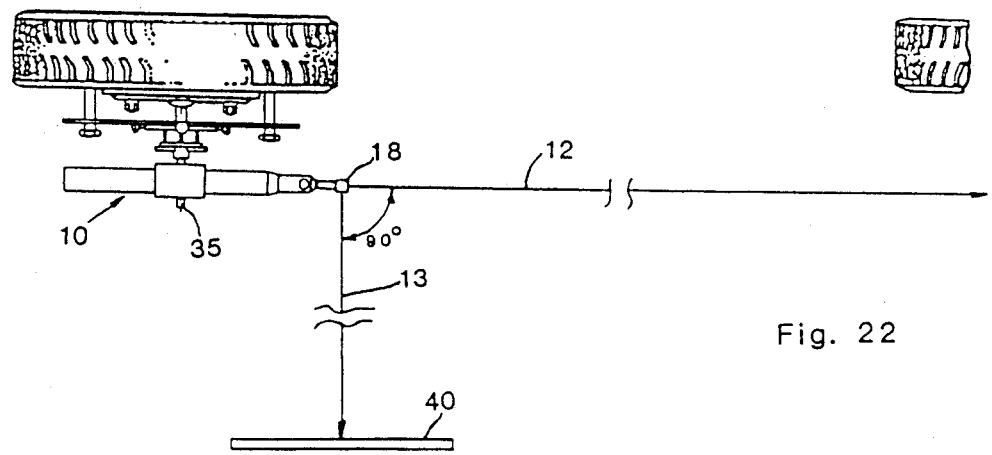
Figure 23:
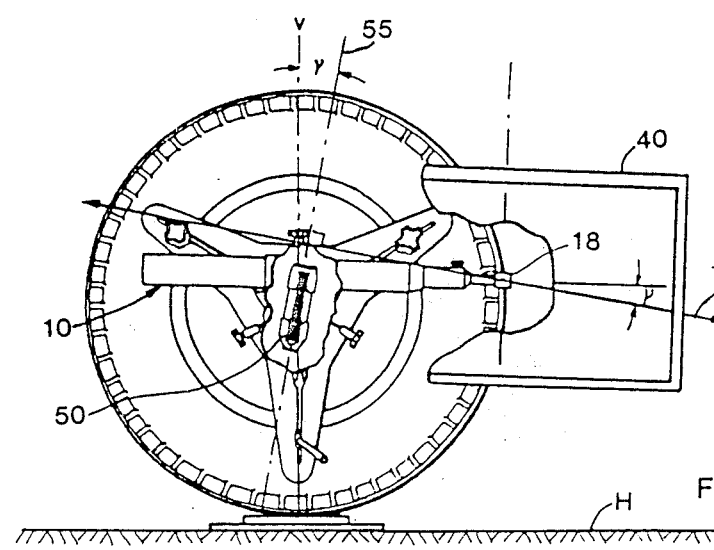

FIGS. 21–23 illustrate in a similar fashion the principle for the measurement in accordance with the invention of the so-called caster angle of a front wheel.

Figure 24:
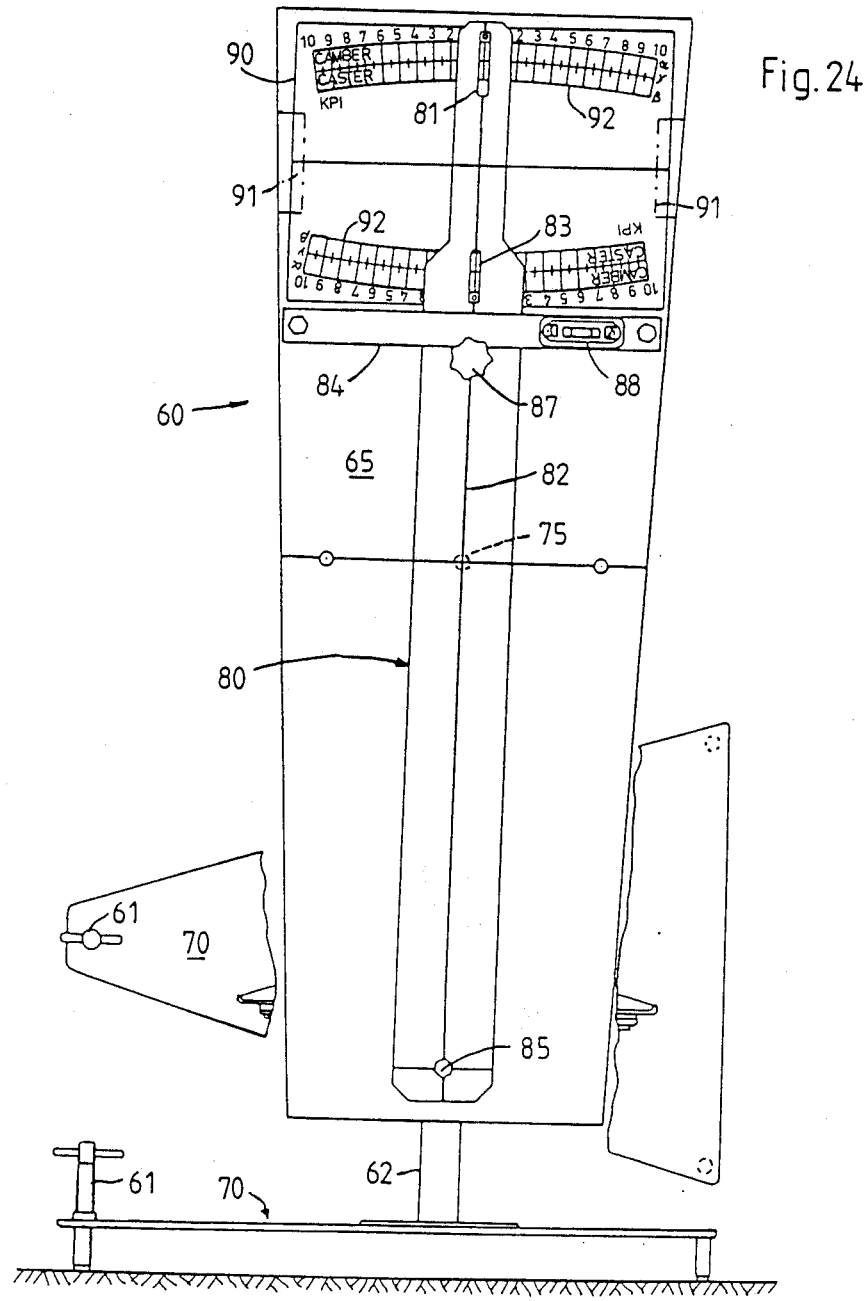

FIGS. 24 and 24a illustrate a front view and a plan view respectively of a measurement panel executed in accordance with the invention for the above-mentioned angular measurements.

Figures 25, 26:
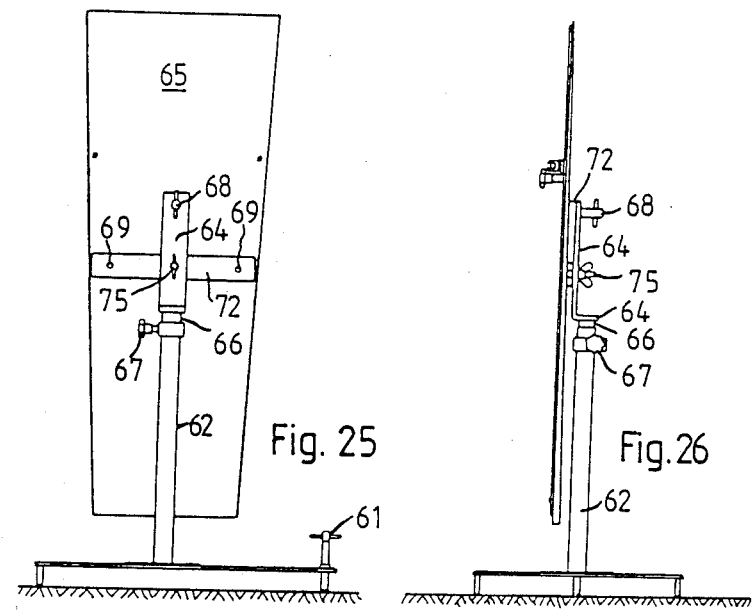

FIGS. 25 and 26 illustrate the measurement panel in accordance with FIG. 24 viewed directly from behind and directly from the side.

Figure 27:
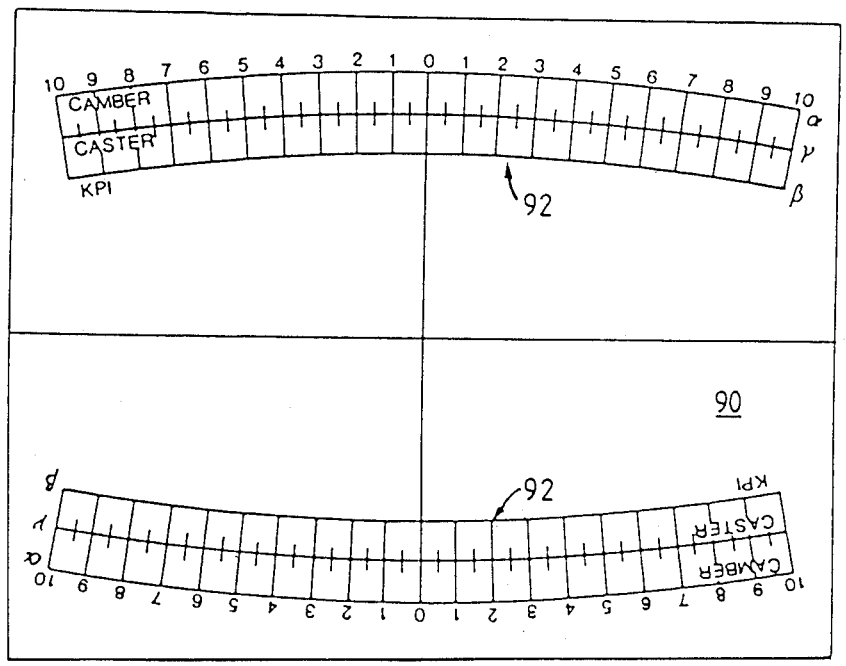

FIGS. 27 and 27a illustrate sheets of paper bearing scales of a kind used for the measurements.

FIG. 28 is an equivalent view to FIG. 24, but illustrates the manner in which the pointer of the measurement panel is deflected to show the camber angle.

FIGS. 29 and 30 show the measurement panel in accordance with the foregoing Figures in the folded or "reclining" position, with the pointer indicating the KPI angle and the caster angle respectively of the front wheel.

FIGS. 31 and 32 illustrate an alternative embodiment of the measurement panel in accordance with the foregoing Figures in two different positions, and FIG. 33 shows a further alternative.

Figure 1:
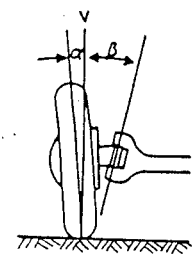
Figure 2:
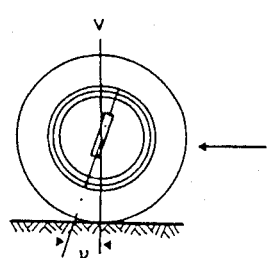
Figure 3:
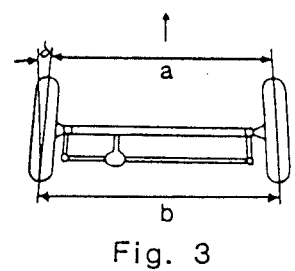
Figure 4:
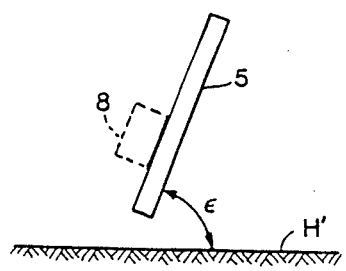
FIGS. 4-8 illustrate a number of the principal relationships which are applicable to the inclination of an object in relation to a plane which either is or is not horizontal in the absolute sense, that is to say perpendicular to the direction of the gravitational force.
Figure 5:
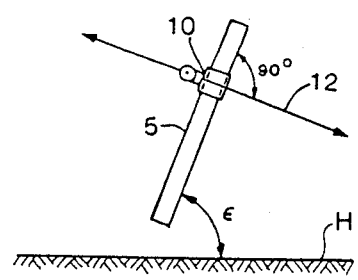

The typical wheel alignment in the front axle and suspension assembly of a motor vehicle is thus illustrated schematically in FIGS. 1-3, with the various wheel alignment angles marked.

To begin with, one front wheel is inclined somewhat in relation to a vertical plane parallel to the vertical plane of symmetry of the vehicle, in which case the wheel is usually inclined outwards somewhat, as indicated by the angle $\alpha$ in FIG. 1, where the vertical plane is indicated by V. It should be noted in this context that the expressions "vertical" and "horizontal", as they appear in the drawing and are applied in the description, do not always relate to, as it were, "absolute" conditions, that is to say conditions which relate to the direction of the gravitational force, but that these designations relate entirely to the vehicle in question. The expression "horizontal plane" is thus intended to denote a plane parallel to the longitudinal axis of the vehicle and in other respects positioned symmetrically in relation to the other parts of the vehicle. For the purposes of the measurements in accordance with the invention the plane on which the vehicle is positioned is referred to simply as the "horizontal plane", in spite of the fact, as has already been emphasized, that the measurements in accordance with the invention do not require this plane to be a "true" or "absolute" horizontal plane in the sense that it extends perpendicularly to the direction of the gravitational force. As has already been pointed out, however, such "absolute" planes are necessary for the execution of previously disclosed measurements of this kind.

The angle marked $\alpha$ between the plane of the front wheel in question and the vertical plane is thus designated as the "wheel inclination", or by the internationally adopted expression "camber".

For the purpose of steering the wheel is caused to pivot about a so-called steering spindle or "king pin", which in turn is inclined in relation to the wheel, said inclination having different values in different projections. When viewed directly from the front or from the rear, the spindle pin is inclined at the angle $\beta$, see FIG. 1, in relation to the vertical plane, said inclination being designated as the "spindle pin inclination" or "king pin inclination", abbreviated to KPI. If the spindle pin is viewed directly from the side, as illustrated in FIG. 2, the spindle pin forms the angle $\gamma$ with a vertical plane perpendicular to the plane of the wheel, said angle of inclination being designated, somewhat arbitrarily, as the "axle inclination", or by the internationally adopted expression "caster". It should accordingly be noted that both the KPI angle and the caster angle, $\beta$ and $\gamma$, relate respectively to the spindle pin and refer to its inclination viewed in two directions perpendicular to one another.

Finally, the front wheels are set at a slightly oblique angle to the direction of travel; see FIG. 3, which illustrates the position viewed directly from above when the distance a between identically situated points on the foremost parts of the wheels is less than the distance b between corresponding points on the rearmost parts of the wheels. The planes of the wheels thus form an angle $\delta$ with the direction of travel, and this alignment is known as "convergence" or, in the case of the position illustrated, "toe-in". The reverse situation can also occur, that is to say when a is greater than b ("toe-out"). The convergence in accordance with FIG. 3 has been included in the description in order to provide a complete picture of the critical angles for the front axle and suspension assembly, although the measurement of the angle of convergence $\delta$ is not a part of the invention, since this angle can be measured without major difficulty by application of previously disclosed methods, for example by interpreting the distances a and b or, preferably, with the help of the aforementioned centring device in accordance with U.S. Pat. No. 4,011,659 and the suspended rules desribed in U.S. Pat. No. 4,015,339.

With reference to the particularly schematical FIGS. 4–8, the fundamental observations which follow are of the greatest significance to an understanding of the invention and what has been gained by it. Let us imagine a rod 5, which in space adopts an attitude in which it is inclined at an angle $\epsilon$ to a horizontal plane H'. If this is a "true" horizontal plane, that is to say one which extends perpendicularly to the direction of the gravitational force, the inclination ε of the rod 5 can be determined by means of a levelling instrument or some other element 8 which senses the gravitational force, for example the pendulum instrument which is commercially available under the name Pernumeter (Registered Trade Mark). If H' were to be only approximately horizontal, for example if it were to be represented by an ordinary, non-levelled workshop floor H (see FIG. 5), then ε could, of course, be determined, admittedly somewhat unreliably, by moving the instrument 8 down onto the floor plane in order to determine its deviation from the horizontal plane, whereupon the inclination value obtained in accordance with FIG. 4 could be corrected.

Figure 6:
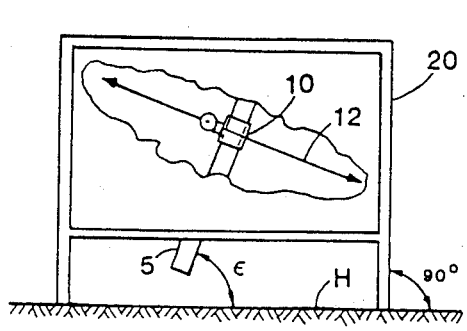

A more simple and accurate method for directly determining the angle of inclination ε, irrespective of whether the plane H is or is not actually horizontal, can be performed with the help of a beam projector, preferably a laser. This is pivotally arranged about the rod 5, so that its light beam extends perpendicular to the longitudinal sense of the rod; see FIG. 5, which illustrates the sweep of the light beam 12 from a laser 10 when the laser is caused to rotate about the rod 5. If the light beam 12 is directed against a screen 20, see FIG. 6, the beam will "draw" a line on the screen, the direction of which line is obviously determined by the inclination ε of the rod 5. If the screen 20 consists of a simple, rectangular framework which is erected directly in line with the laser and precisely perpendicular to the plane H, the line drawn by the beam 12 will form the angle ε with the vertical side of the frame, as illustrated in FIG. 6. If the screen 20 is provided with appropriate reference lines or co-ordinates, which can be aligned with the plane H by adjusting the screen 20, the angle ε can then be measured directly on the screen.

Figure 7:
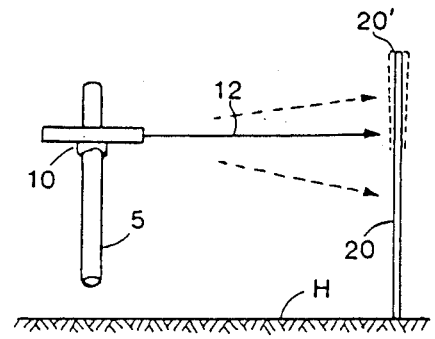
Figure 8:
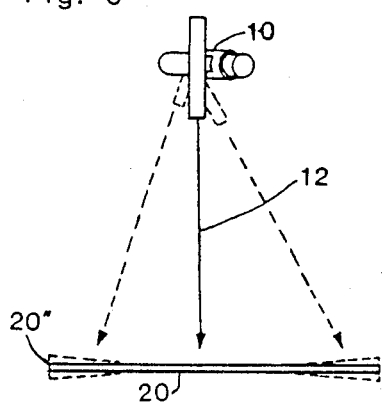

Fundamental to the invention is the principle of angular measurement illustrated particularly schematically in FIG. 6. FIGS. 7 and 8 show the arrangement in accordance with FIG. 6 viewed from the side and from above and illustrate an extremely important relationship for the measurements in accordance with the invention. The screen 20 is thus erected directly in front of the rod 5 and the laser 10, so that the beam 12 of the latter in a central position strikes the screen approximately at right-angles, and as it moves from side to side about the rod 5 draws a line on the screen, in which case the inclination ε of the line can thus be determined in accordance with the above. It can now be appreciated from FIGS. 7 and 8 that certain minor errors in the alignment of the screen 20 have an extremely insignificant and entirely negligible effect on the measurement result when determining ε. If the screen were to be inclined slightly forwards or rearwards in relation to the laser 10, as illustrated by 20' in FIG. 7, or were to stand at a slight angle in relation to the neutral position of the beam 12, as illustrated by 20" in FIG. 8, this would clearly have an extremely insignificant effect on the path of the line drawn on the screen. Nevertheless the screen must stand vertically in its own plane, so that its reference lines or coordinate systems are in the correct alignment in relation to the floor plane H.

Figure 9:
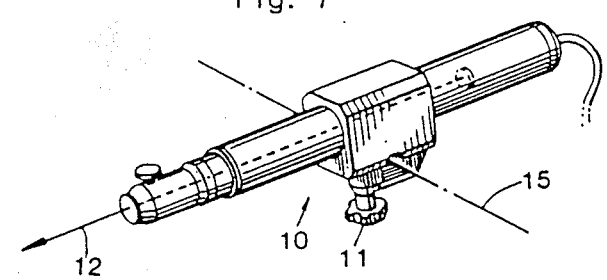
FIG. 9 illustrates an example of a typical laser beam machine which is suitable for the purpose of the invention.

Illustrated in FIG. 9 is a typical laser beam machine 10, which is suitable for the purposes of the invention. The laser can be secured by means of a clamping arrangement 11 to an axle with the centre line 15, in which case the illustrated, intensely coherent, typical laser beam 12 extends precisely perpendicularly to the centre line 15.

Figure 10:
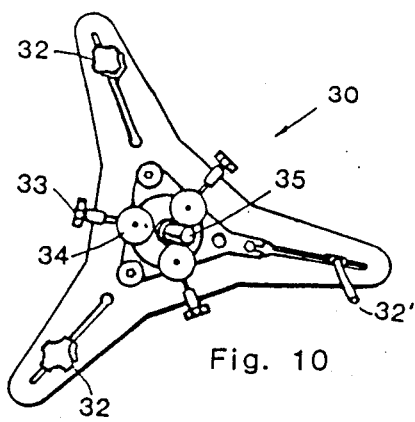
FIG. 10 is a perspective view of a centring device in accordance with Pat. No. 7405412-3 utilized for the purpose of the invention.
Figure 11:
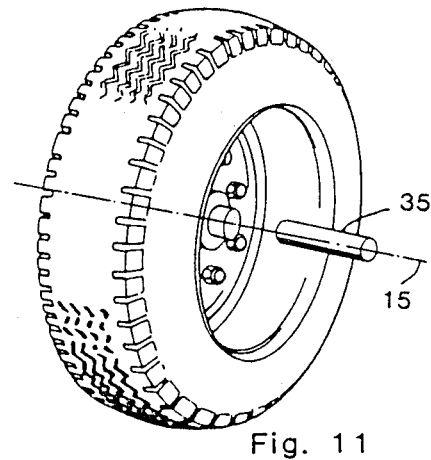
FIGS. 11 and 12 illustrate in principle the manner in which a physical prolongation of the axis of rotation of a wheel is provided and is utilized for the purpose of the invention.
Figure 12:
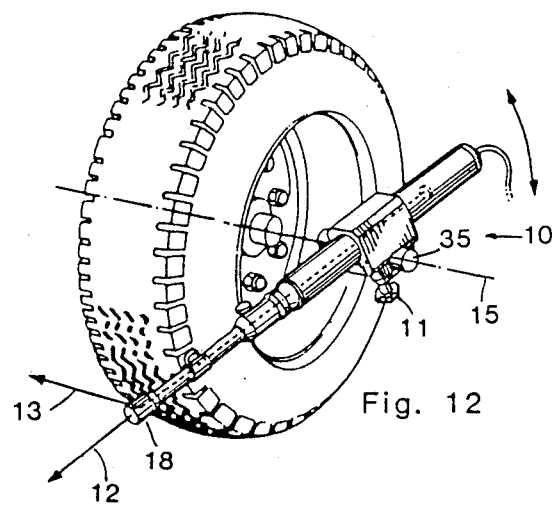

In order, in accordance with the invention, to determine the actual wheel alignment angles referred to above, an arrangement is first created which makes it possible to perform the measurements entirely in a similar manner to that illustrated schematically in FIGS. 5-8 for the purpose of determining the inclination of the rod 5 illustrated there. The previously mentioned centring device in accordance with U.S. Pat. No. 4,011,659 was used for this purpose; see FIG. 10. Reference is made to that patent for a more detailed description, although in order to facilitate the understanding of what now follows, a brief, summarizing description is now given with reference to the aforementioned FIG. 10. This illustrates a centring device 30 in the form of a triangular base plate, which, by means of hook-like gripping devices 32 operated by threaded hand-wheels, can be attached permanently to a vehicle wheel rim of to all intents and purposes any desired dimensions. Attached to the plate is a ground, cylindrical pin 35, which is connected to other plate devices arranged on the base plate, which plate devices can be displaced on and tilted in relation to the base plate by means of clamping devices 33 and 34, in which case the arrangement is such that the pin 35 can rapidly be caused to adopt a position which is precisely coaxial with the wheel to which the centring device is attached; in other words, the centre line of the pin 35 coincides precisely with the axis of rotation of the wheel. What this means, as illustrated symbolically in FIG. 11, is that one is presented with a cylindrical pin 35 situated outside the wheel and attached securely to the wheel, which pin physically and precisely represents the axis of rotation 15 of the wheel. A laser 10 can be clamped to this pin 35, as illustrated in FIG. 12, and in accordance with the foregoing the beam 12 of the laser will be precisely perpendicular to the axis 15 of the pin 35, and thus to the axis of rotation of the wheel; if the laser is caused to rotate about the pin, the beam will sweep in a plane parallel to the plane of rotation of the wheel. As illustrated in FIG. 12, the laser can have fitted to it a deflector accessory 18 enabling a laser beam 13 to be obtained which is precisely at right-angles to the beam 11. An accessory of this kind, based on specially arranged prisms, is described in U.S. Pat. No. 4,135,823, to which reference is made.

It is now possible with considerable accuracy to determine the desired wheel alignment angles, in the manner described below.

Figure 13:
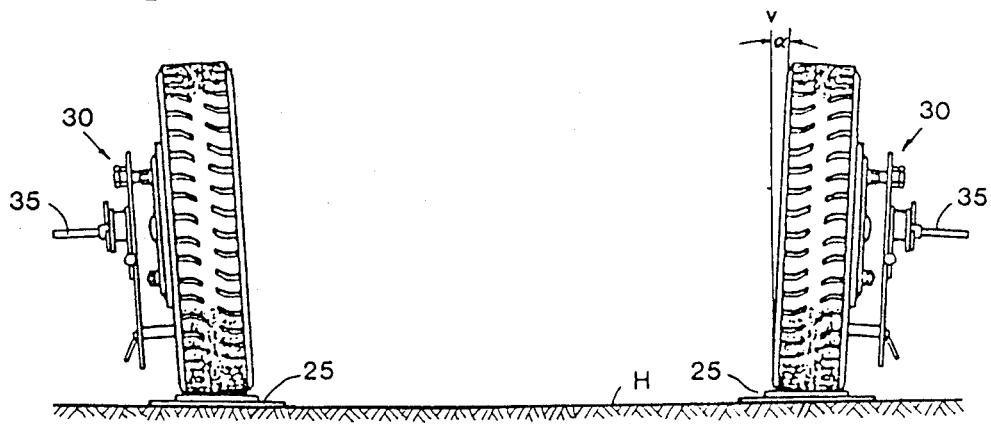
FIG. 13 illustrates the front wheel of a vehicle viewed directly from the front, with the remaining parts of the vehicle removed, but fitted with centring devices in accordance with FIG. 10 and positioned on rotating plates of a previously disclosed type.

A centring device 30 in accordance with the foregoing is attached to each front wheel, and the measurement procedure can commence. The starting position is shown in FIG. 13, which is a view directly from the front of the wheels in the front axle and suspension assembly of a motor vehicle, in conjunction with which the surrounding components have been omitted in the interests of clarity, and in addition the wheel inclination or camber α described above has been slightly exaggerated. It will be seen that the wheels are in contact with the ground H (which, in accordance with the provisions of the invention, need not be horizontal in the true sense) via friction-reducing rotating plates 25 of a previously disclosed type, so that the steering movements of the wheels required during measurement can be executed easily by means of the vehicle steering wheel.

Figure 14:
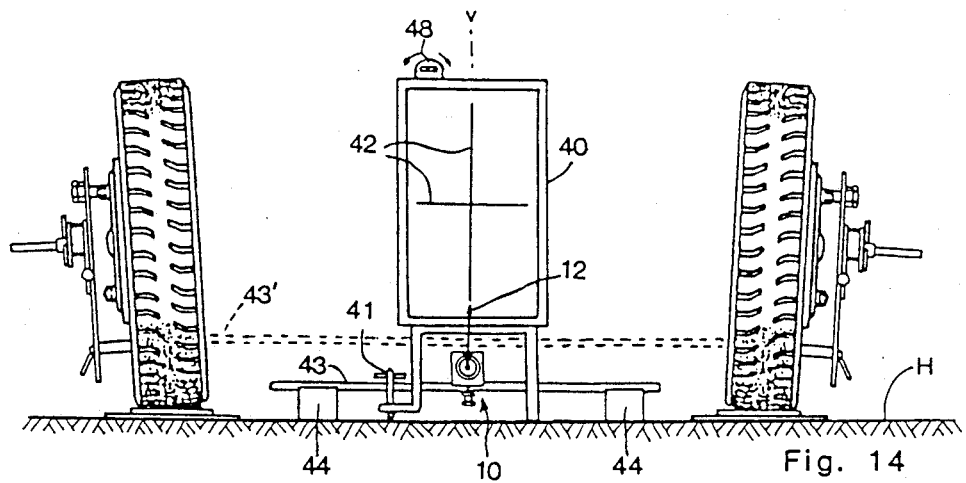
FIGS. 14-16 illustrate schematically and in principle the manner in which the so-called camber angle of a front wheel is measured.
Figure 15:
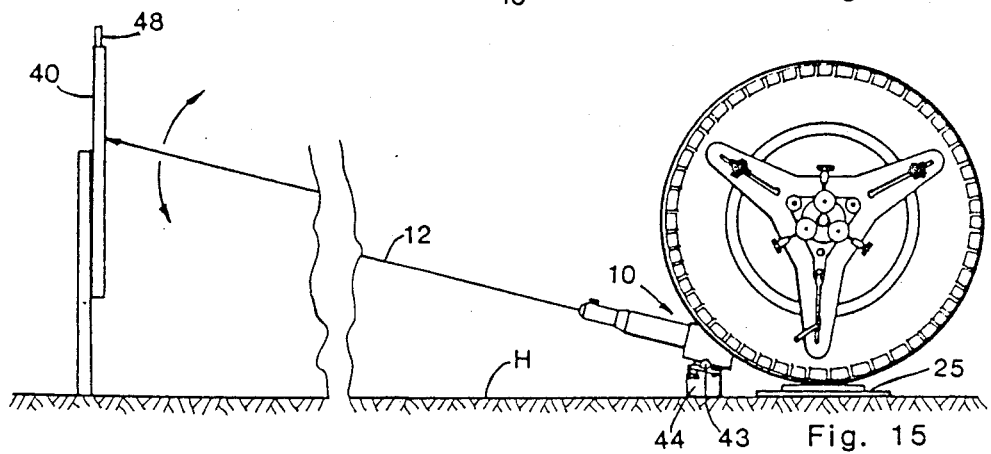

A screen or a measurement panel equivalent to the screen 20 illustrated schematically in FIGS. 6-8 is required for the measurements. Illustrated in FIG. 14, also in a highly schematic form, is a suitably designed measurement panel 40, on which reference lines, for example in the form of a co-ordinate system 42, have been drawn. The measurement panel is placed on the floor plane H at a point a certain distance directly in front of the wheels, and approximately half-way between them; see FIGS. 14 and 15. Positioned internally between the wheels is a straight rod 43, of the same diameter as the pin 35 of the centring device, resting in two identical 'V'-blocks 44, so that the rod extends between the wheels approximately at right-angles to the imagined direction of travel. A laser 10 is attached to the rod directly in line with the measurement panel 40, and its beam is allowed to sweep up and down on the panel, as illustrated in FIGS. 14 and 15. By means of an adjuster screw 41 arranged on the foot of the measurement panel the panel is adjusted so that the laser beam follows a vertical reference line on the measurement panel, that is to say the beam and the reference line coincide along a vertical line indicated by 'V'. It should be remembered that the floor plane H does not need to be actually horizontal, although it should extend more or less evenly. As will be appreciated from FIG. 14, the laser beam 12 will then follow a vertical plane V which is perpendicular to the floor plane H, and the question of whether the latter is horizontal in the true sense is irrelevant. A more reliable adjustment, especially if the floor plane is suspected of being uneven, will be obtained if the rod 43 is replaced by a longer rod 43', which extends between the two wheels and rests directly on their rim edges, as illustrated by broken lines in FIG. 14, instead of resting in 'V'-blocks on the floor.

Figure 16:
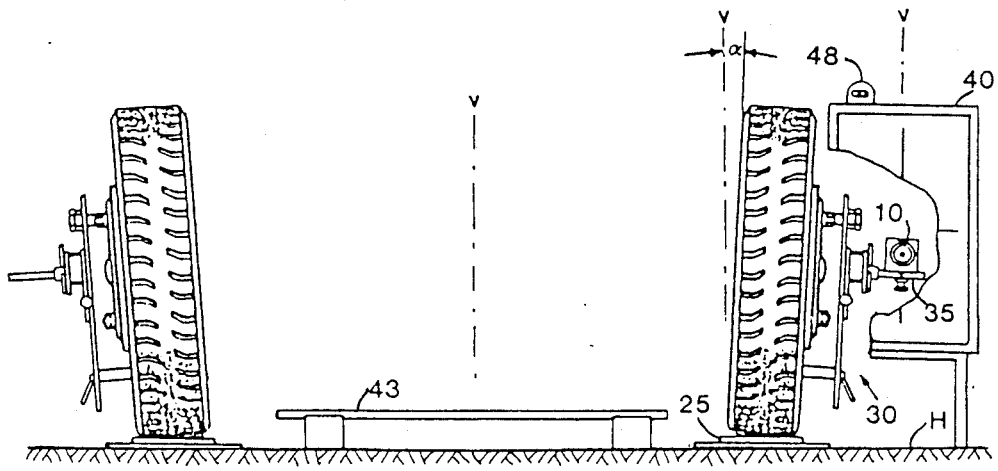

The measurement panel 40 is equipped with a simple, pivotally adjustable level 48, which is zeroed, that is to say is set to an appropriate horizontal attitude for the level, after the adjustment of the measurement panel 40 referred to above. The measurement panel 40 is now displaced laterally in a straight line until it is directly in front of the pin 35 of the centring arrangement 30 on one of the front wheels; see FIG. 16. If the floor plane H is level and even, the deflection of the level will not, of course, change after the displacement; should this have happened, however, due to a change in the inclination of the floor in the new position, the vertical attitude in accordance with FIGS. 14 and 15 can be reset with the help of the adjuster screw 41 of the measurement panel, so that the level 48 again exhibits the zero attitude set before the displacement. Once the setting of the measurement panel in the new position has been checked, the laser 10 is transferred to the pin 35 of the coacting centring arrangement 30; see FIG. 16.

Before describing the execution of the actual measurements, an alternative to the initial adjustment illustrated will be described with reference to FIGS. 17 and 18. The measurements taken through this alternative arrangement are to all intents and purposes entirely unaffected by the floor surface H, which for illustrative purposes is shown to be extremely uneven in FIG. 17 and almost to be undulating. A straight rod 45, which can be extended telescopically, is positioned between the wheels, resting on their rim edges, like the previously mentioned rod 43'. Attached close to one end of the telescopic rod 45 is a rigid, projecting arm 46, from the outer, free end of which there extends a secondary arm 47, which is precisely parallel to the telescopic rod 45 and is thus only displaced in relation to it, more specifically in such a way that it can move past the wheel, in front of it, and over to the outside of the wheel, as is shown quite clearly in FIGS. 17 and 18. Beyond the wheel the secondary arm 47 rests in a 'V'-block 44. The telescopic rod 45 with its projecting arm 46 and its secondary arm 47 now rests statically defined at three points, not only on the rim edges of the wheels, but also on the 'V'-block 44. The secondary arm 47 thus extends perpendicularly to the vertical plane of symmetry of the vehicle, entirely unaffected by the form and inclination of the underlying floor surface. The laser 10 can thus be attached to the free end of the secondary arm 47, as shown in FIG. 17, whereupon the measurement panel 40 is positioned directly in front of the laser outside the wheel. If the measurement panel is now caused by means of its adjuster screw 41 to coincide in its direction with the direction of the sweep of the laser beam 12, as described in conjunction with FIGS. 14 and 15, the position of the measurement panel will already be definitive, and contrary to the case of the arrangement in accordance with FIGS. 14–16, no displacement of the panel will be necessary before the laser 10 is displaced upwards on the centring pin 35. It should be noted that the measurement panel 40 can now also be positioned at the rear, alongside the rear wheel or even further back, should there be insufficient space ahead of the vehicle. In this case the laser is turned over completely.

The determination of the camber takes place in accordance with the principle illustrated in FIG. 19. The measurement panel 40 is thus positioned in the manner illustrated in FIG. 16, with its vertical reference lines parallel to the vertical plane V, as described above. The steering pivot pin bearing 50 of the wheel is illustrated schematically together with the stub axle 52 of the front wheel in FIGS. 19 and 20. Since the bearing journal 35 of the centring device is precisely coaxial with the wheel axis 15, the laser 10 attached to the centring pin will draw a line with its beam 12 on the measurement panel 40, which will form the angle $\alpha$ with the vertical V, this being the camber angle. If the path of the line is marked on the panel, a direct reading of the camber angle will be produced in this way.

It should be apparent from the above description that it is not, in actual fact, necessary to utilize fully the capacity of the centring device 30 to provide a pin 35 which is precisely coaxial with the wheel axle 52. It is obviously sufficient if the pin is precisely parallel to the wheel axle, which is applicable to all the measurements in accordance with the invention. This means that, in this respect, too, it is possible to use simplified centring devices for the execution of the invention.

Measurement of the steering pivot pin inclination, or KPI, takes place in a manner similar to that described immediately above, although with a slightly different arrangement; see FIG. 20. The measurement panel 40 is so executed as to be capable of pivoting about an axis perpendicular to the plane of the panel and is so arranged as to be locked in two mutually perpendicular positions. The panel can also be raised and lowered; the arrangement of the panel in this way is described immediately below.

According to FIG. 20 the measurement panel 40 has thus pivoted through 90° and is lying horizontally in its longitudinal sense. The laser 10 situated on the centring pin 35 is fixed in an approximately horizontal position, so that its beam strikes approximately the centre of the measurement panel. The wheel is now caused to describe steering movements about the steering pivot pin 50, the centre line 55 of which, when viewed in this projection (that is to say, from straight ahead), forms the angle $\beta$ (KPI) with the vertical V. If the wheel pivots about the axis 55 of the steering pivot pin, the beam 12 of the laser 10 attached to the centring pin 35 will obviously draw a line which forms the angle $\beta$ with the horizontal reference lines of the panel, as shown in FIG. 20. In order for the laser which is attached to the pin 35 to indicate how the wheel is rotated about the steering pivot pin 50 itself, the wheel is, of course, not free to rotate about its own axis 15 at the same time. The wheel is thus kept locked by its brakes during the steering movement.

The reason for the arrangement of the measurement panel described above should be apparent from a comparison between FIGS. 19 and 20. In the interests of measurement accuracy, the laser beam should be capable of describing the longest possible sweep over the panel during measurement, and the panel should accordingly be quite long in the direction of the sweep. As described above, the beam sweeps in a plane in the vicinity of the vertical plane when measuring the camber (FIG. 19), whereas it sweeps in a plane in the vicinity of the horizontal plane when measuring the KPI (FIG. 20). In order to prevent the measurement panel from being unmanageably large, it should be designed to be quite long, but narrow and capable of pivoting. It should also be designed to be capable of being raised and lowered, so that its central area can be maintained more or less at the height of the wheel hub, that is to say so that the laser beam, when in its more or less horizontal starting position, strikes the centre of the panel.

In describing the measurement of the camber and KPI angles it has been assumed, for the sake of simplicity, that the laser beam is used "directly", so to speak, i.e. the laser follows the movement of the wheel and its beam draws directly on the screen. But of course the beam can also be subject to reflection, e.g. against a mirror, before it strikes the screen, thus the mirror instead of the laser following the wheel, an arrangement which may be practical in certain cases. See for example FIG. 17: it might be easier and more convenient to mount a mirror having a correctly oriented mounting on the end of the secondary arm 47 than to mount there the heavy laser 10; this is secured instead in a suitable manner adjacent the screen 40, for example, on the stand or foot carrying the screen. The laser beam is reflected against the mirror pivotable on arm 47 and the screen is adjusted as has been described. Then the mirror is moved up onto the pin 35 and its reflected laser beam will show the camber and KPI angles on the screen 40, precisely as before. In principle the measuring procedure as illustrated in FIGS. 19 and 20 is not changed; the beam 12 now only emanates from a mirror on the pin 35 and not directly from the laser 10 mounted on the pin as shown in the figures.

It now remains to measure the caster angle $\gamma$, that is to say the so-called front axle inclination, for which purpose said measurement is performed in the manner illustrated in FIGS. 21-23. In this case the measurement panel 40 is positioned alongside the vehicle, parallel to and at a certain distance from it. The laser 10 is turned over completely and is secured in a position on the centring pin 35 in which the beam 12 is parallel to the horizontal reference plane of the vehicle. In this position the dimensions x in accordance with FIG. 21 shall be identical, which can be verified using an ordinary measuring rod; tolerances will be sufficiently close, thanks to the long distance between the points of measurement and the intensely coherent nature of the laser beam, causing the beam to produce a small, sharp-edged spot of light which facilitates all scale readings.

In this case the laser is equipped with its prism accessory 18 illustrated in FIG. 12, which means that the laser emits its beam 12 at the same time as a beam 13 deflected at precisely 90° which is directed at the measurement panel 40; see FIG. 22. The prism 18 is rotated so that the beam 13 sweeps over the measurement panel in the vertical sense. The position of the panel is adjusted with the previously mentioned adjuster screw, so that the beam 13 draws a line, the direction of which coincides with the direction of the vertical reference lines of the panel. Once the panel has been adjusted in this way, it is rotated through 90° for the aforementioned reasons before the laser beam 13 is caused to execute its "measurement sweep", as illustrated in FIG. 23. As has already been mentioned, the laser is fixed on its centring pin, and the prism accessory 18 is also fixed, so that its beam 13 is approximately horizontal and strikes the measurement panel 40, the height of which has been adjusted so that the beam 13 strikes it approximately at its centre. Using the steering wheel of the vehicle, the road wheel is again caused to execute steering movements (with the brakes locked; see the reasoning relating to FIG. 20), that is to say it pivots about its steering pivot pin 50, as illustrated in FIG. 23. When viewed in this lateral projection, the axis 51 of the steering pivot pin is inclined at the angle $\gamma$, the caster angle, in relation to a vertical plane V perpendicular to the longitudinal axis of the vehicle. In this case, too, a simple geometrical relationship exists between the intended angle and the sweep of the laser beam, more specifically such that the beam 13 will draw a line on the measurement panel 40 which forms the angle $\gamma$ with the horizontal reference lines of the measurement panel, all of which can be appreciated from FIG. 23.

It should be apparent from the above description that a decisive role for the execution of the invention is played by the measurement panel 40, which until now has been illustrated only schematically, in addition to that played by the previously disclosed centring arrangement 30 or equivalent arrangement. It has been shown that the angles $\alpha$, $\beta$ and $\gamma$ which it is wished to measure, that is to say the camber, KPI and caster angles, can be marked on the measurement panel in a simple fashion and with considerable accuracy. Nevertheless, it is obvious that, if the method of measurement in accordance with the invention is to be capable of finding actual, practical application, then the measurement panel must be so executed as to offer the possibility of the direct reading and recording of the measurement values without the need for any complex or time-consuming manipulations. The problem of producing a measurement panel in this way which finds practical application for the purposes of the invention is not entirely simple, but appears to have been given a practical and functional solution in the form of the measurement panel described below and referred to in FIGS. 25-30 and, as an alternative proposal, in FIGS. 31 and 32.

The measurement panel 60 suitable for practical application in accordance with the invention thus comprises (see FIG. 24) a long base plate or panel sheet 65 tapering towards the bottom which is supported by a frame consisting of a vertical, tubular upright 62 mounted on a triangular foot plate 70 (see FIG. 24a). FIGS. 25 and 26 show the measurment panel viewed respectively from the rear and from the side, and it can be seen from the Figures that the sheet 65 is pivotally mounted in the area of its central part on a bracket 64 attached to a tube 66 capable of telescopic displacement in the upright 62. In this way the measurement panel as a whole is capable of being raised and lowered, in conjunction with which the height adjustment can be locked in position by means of a hand wheel 67. The panel sheet 65 is suspended on and pivotable about a central bearing 75, and it can be secured in a previously disclosed manner in mutually perpendicular positions by screwing a locating screwed pin 68 into one or other of three guide holes 69 in a 'T'-shaped holder 72 on the rear of the panel sheet. The measurement panel as a whole is supported on the flat tripod 70, and the inclination of the panel in its own plane can be regulated by means of an adjuster screw 61.

As will be appreciated from FIG. 24, the front face of the panel sheet 65 is provided with a pointer 80 which extends along practically the entire length of the sheet and is pivotally mounted at the bottom about a point 85. The pointer 80 can be pivoted through about 10° from side to side beneath a transverse strip 84, to which it can be locked in any set position by means of a hand wheel 87. Attached to the strip 84 is a level 88, corresponding to the previously mentioned level 48 and pivotally mounted so that, when the measurement panel 60 as a whole has been adjusted to a certain vertical position by means of its adjuster screw 61, the level can be zeroed. If the panel is then displaced, perhaps causing its angle of inclination to change, its angle of inclination can be reset by means of the adjuster screw 61 with reference to the level 88, in the manner described in conjunction with FIGS. 14-16.

A sheet of paper 90 bearing a scale is secured to the top of the panel sheet 65. This scale sheet, which is illustrated in more detail in FIG. 27, and its arrangement together represent a major practical aspect of the invention. As will be appreciated from FIG. 27, the scale sheet 90 exhibits two curved angle scales 92 arranged directly in line with one another and mutually symmetrically on the sheet. Each scale starts from a zero position and displays the angles 1°–10° to the right and to the left. The scales can be seen to be divided into three sections, such that the angle $\alpha$ (camber) can be marked on the top section, the angle $\beta$ (KPI) on the bottom section, and the angle $\gamma$ (caster) on the middle section. The pointer 80 has two windows 81 and 83 (see FIG. 24) situated close to the tip of the pointer, which windows are centrally positioned so that each lies over its appropriate scale 92 on the scale sheet 90. The scale sheet 90 consists of a loose sheet of paper, and the dotted and dashed line 91 in FIG. 24 is used to indicate a clamping arrangement of any appropriate kind, by means of which the scale sheet 90 can be clamped to the upper part of the panel sheet, in such a way that, with the pointer 80 in its neutral position, the zero graduation on the scale sheet will appear symmetrically in the respective windows 81 and 83. The scales are curved, as has already been mentioned, said curvature coinciding with the radius of the pointer 80, so that the deflections of the pointer along the upper scale can be read off at all times through the upper window 81. As will readily be appreciated, this scale relates to the situation as it affects one of the front wheels, for example the left-hand front wheel; if the scale sheet is turned over completely, so that the bottom scale lies at the top, measurements can then be carried out on the right-hand front wheel, the angular values for which can be read off on what has now become the top scale (the lower pointer window 83 serves only for the alignment of the scale sheet 90).

For the sake of completeness there is shown in FIG. 27a a variant 90a of the scale sheet which need not be turned over. In this case all measurements on the left side of the vehicle are marked on the top scale 92', whereas measurements on the right side are marked on the bottom scale 92''. In connection with making the scale sheets two holes 93 for orienting purposes can be punched at the same time as the scales are printed. The lower window 83 of the pointer 80 (see FIG. 24) can then be disposed with while in return the upper window 81 is made a bit longer.

The use of the measurement panel 60 should be readily understood in view of the above description of the principal considerations relating to the measurement of angles in accordance with the invention. In conjunction with the initial adjustment of the panel in accordance with FIGS. 14 and 15, for example, the pointer 80 is thus locked in its zero position (see FIG. 24), and the lateral relative positions of the panel and the laser are determined so that the laser beam strikes the pivot point 85 of the pointer. The beam is then allowed to sweep upwards, and the panel is adjusted by means of the adjuster screw 61 on the foot 70 of the measurement panel in such a way that the sweep of the laser beam follows the centre line 82 of the pointer and thus the centre line of the whole panel. It follows from the rest of the arrangement, as will be appreciated from the preceding description, that the pointer is now standing "vertically" in the same attitude as the vehicle, that is to say the direction of the pointer is parallel to the vertical plane of symmetry of the vehicle.

If the measurement panel 60 with its vertical adjustment maintained is now displaced laterally to a position directly in front of the centring pin 35 of the wheel, to which pin the laser 10 is now attached (see FIG. 16), and if the lateral position of the two components 10 and 60 is adjusted so that the laser beam strikes the pointer bearing 85 on the measurement panel, the camber angle $\alpha$ can be determined directly by causing the laser to be pivoted upwards and the pointer 80 in turn to be pivoted in such a way that the laser beam strikes and follows its centre line 82. The pointer is locked in this position (see FIG. 28), and a pen is introduced into the top windows 81 and marks the deflection of the pointer on the $\alpha$-part of the upper scale 92 on the scale sheet 90.

The panel sheet 65 is now caused to adopt its horizontal or "reclining" position by being pivoted through 90° about its centre of pivoting 75 and by being locked in this position (see FIG. 29). This position now corresponds to that illustrated in FIG. 20, which means that the height of the measurement panel has been adjusted in such a way that the laser beam sweeps along the centre of the panel when the wheel executes its steering movement, and more specifically in such a way that the beam passes through the pivot centre 85 of the pointer. If the pointer is then adjusted so that the beam follows its centre line 82, the KPI angle $\gamma$ can be read off directly in the window 81 of the pointer and, as previously, can be marked on the scale 92 of the scale sheet 90 by means of a pen (see FIG. 29).

Determination of the caster angle $\gamma$ takes place in a similar manner to that illustrated in principle in FIGS. 21-23. The measurement panel 60 is thus positioned alongside the vehicle, and directly opposite the front wheel of which the caster angle is to be measured, and the deflected beam 13 of the laser securely locked to the centring pin 35 is caused to sweep up and down along the measurement panel 60. The latter is adjusted by turning the adjuster screw 61 of the foot, so that the beam 13 follows the centre line of the panel sheet 65, that is to say the centre line 82 of the zeroed pointer 80. The panel sheet is now folded down and is locked in its reclining position. The locked wheel is caused to execute steering movements, and the height of the panel sheet is adjusted (by means of the telescopic coupling 62, 66 and the locking hand wheel 67; see FIGS. 25 and 26), so that the beam 13 (FIGS. 22, 23) passes the pointer bearing 85. If the pointer 80 is then pivoted so that the beam follows its centre line 82, the caster angle γ can be read off in a similar fashion to that described previously on the angular scale 92 of the scale sheet 90 and can be marked in the window 81; see FIG. 30.

The measurements on the opposite front wheel are performed exactly as described, but only after the scale sheet 90 has been turned over completely (unless alternative 90a is used) so that the lower of the scales 92 can now be read off through the window 81.

Illustrated in FIGS. 31 and 32 is a measurement panel 60' which constitutes a simplified alternative to the measurement panel 60. The panel 60' thus has no folding panel sheet, but its pointer 80' is instead equipped with two "auxiliary pointers" 95 which are supported at the bottom on the main pointer 80' and are capable of being folded outwards, as shown in FIG. 31. In their outward folded position these come up against a supporting heel 96, which is installed centrally at the very bottom of the main pointer 80'. In this position the auxiliary pointers 95 are locked by means of small locking hand wheels 97, and the whole is so adapted geometrically that centre lines 99 on the auxiliary pointers 95 coincide with regard to their direction and pass through the pivot centre 85' of the main pointer 80'. They then also extend precisely perpendicular, of course, to the centre line 82' of the main pointer 80'.

It is in this way that the desired long, horizontal reference line is obtained without the need to fold down the panel. The measurement panel 60' is arranged with a longer telescopic coupling in its upright 62' than the panel 60, so that it is possible to raise it higher. The pivot centre 85' of the pointer can thus reach the same level as the hub of the front wheel for those measurements in which the auxiliary pointers 95 are used, which facilitates the measurements and increases their accuracy. In other respects the alternative measurement panel 60' is used in precisely the same way as that described previously.

An alternative which is cheaper, although meaning that an extra, separate item be involved, is indicated in FIG. 33. The auxiliary pointers 95 are replaced here by a loose sheet or board 100, light but rigid, which is screwed onto the pointer and follows this during the KPI and caster measurements. The board 100 is provided with coordinate lines 82'' and 99'' so that the effect will be the same as with the arrangement in accordance with FIGS. 31 and 32.

It has been claimed in the foregoing, or, perhaps more precisely, it has been maintained that the measurements in accordance with the invention produce extremely accurate results of measurement. Having regard for the fact that many of the adjustments and positions of the components concerned which take place during the execution of the invention have been described as "approximate", that is to say could be made by eye, it may be appropriate by way of conclusion to explain in more detail and to justify this insistence on accurate results of measurement.

What may be referred to as the basis are the accuracy and the precision of the laser 10 and the centring device 30 which are used. The former must have a mounting 11 which engages securely and precisely around the pin 35 of the centring arrangement, so that the laser beam 12 is truly perpendicular to the pin. This is turn must be capable of being adjusted until it is precisely parallel to the axis of rotation of the wheel. These are requirements of a mechanical and production engineering nature which are easily satisfied.

The level of accuracy achieved can be explained by two factors. Firstly, the laser beam is an unsurpassed marker or "pointer": weightless, narrow, absolutely straight, and long. The laser beam is able to describe sweeps of a meter in length on the quite distant measurement panels, with large, clear angular deflections; see the graduations on the scale sheet in FIG. 27 (in actual fact the scale sheet 90 is considerably larger). Secondly, there is the setting up of the measurement panel 60 or 60' itself, which need only be adjusted accurately in its own plane in order to comply with the conditions of measurement, this being a procedure which is easy to execute and verify. Minor misalignment in other respects is without significance; see the discussions in connection with FIGS. 7 and 8.

The accuracy achieved in accordance with the invention in respect of what have until now been regarded as extremely difficult measurements can be achieved in this way, as can the reason why they can be performed as described in an ordinary workshop environment without the need for expensive arrangements and work stations.

The invention is described above with reference to a specified and executed example of its implementation, although this illustrative example of the invention is intended only to explain and clarify, and not to restrict the scope of the invention, as this is defined in the accompanying Patent Claims.

I claim:

1. A method for measuring the standard characteristic angles of camber, king pin inclination, and caster for one of first and second steerable wheels of a front axle and suspension assembly of a vehicle in relation to mutually perpendicular reference planes containing longitudinal, transverse and vertical axes of the vehicle, the method being carried out with the wheels installed on the vehicle and independently of whether the vehicle is on a level surface which is horizontal in a true sense, comprising the steps of: installing on the first wheel an elongation pin so that a lengthwise axis of the pin extends parallel to an axis of rotation of the first wheel; locating a friction-reducing device beneath the first wheel for the purpose of facilitating steering movements thereof during the measurements; providing a beam projector having holding means for supporting the projector on the elongation pin so that the projector can pivot about the axis of the pin while the emitted beam remains perpendicular to the axis of the pin and to the axis of the first wheel; placing a screen provided with a reference line a predetermined distance in front of and facing the first wheel; orienting the screen so that the reference line thereon coincides with the reference planes of the vehicle by temporarily pivotally supporting the projector by the holding means on a bar supported adjacent the first and second wheels and parallel to a line extending through two points respectively equally situated on the first and second wheels while adjusting the position of the screen in its own plane until the beam emitted when the projector is pivoted about the lengthwise axis of the bar defines a line across the screen which is parallel to the reference line on the screen; thereafter supporting the projector on the elongation pin using the holding means; thereafter pivoting the projector about the axis of the elongation pin so that its beam sweeps across the screen and defines a camber line; and recording the angular position of the camber line in relationship to the reference line of the screen as the camber angle.

2. A method according to claim 1, wherein the step of temporarily supporting the projector on the bar includes the step of supporting the bar between the first and second wheels on spaced identical supporting devices each disposed on a surface supporting the vehicle.

3. A method according to claim 1, wherein the step of temporarily supporting the projector on the bar includes the step of supporting the bar between the first and second wheels so that each end of the bar rests on an inner rim edge of a respective one of the first and second wheels.

4. A method according to claim 1, wherein the step of temporarily supporting the projector on the bar includes the steps of supporting a straight elongate rod so that each end thereof rests on an inner rim edge of a respective one of the first and second wheels, providing on the rod a rigid outwardly projecting arm, providing the bar on the arm so that the bar is parallel to and spaced from the rod and extends past and to the outside of the first wheel to be measured, and providing a single supporting device for the bar on a surface supporting the vehicle.

5. A method according to claim 1, including the additional steps of positioning the beam of the projector approximately perpendicular to the screen, actuating a brake for the first wheel, and effecting steering movements of the first wheel so that the beam of the projector on the pin sweeps laterally across the screen and defines a king pin inclination line, and recording the angular position of the king pin inclination line in relation to a reference line on the screen as the king pin inclination angle.

6. A method according to claim 1, including the additional steps of: providing on the projector a pivotable deflector by means of which the emitted beam can be accurately deflected by 90° in any direction; moving the screen to a position alongside the vehicle at a predetermined axial distance from and facing the first wheel; rigidly securing the projector to the elongation pin so that, with the first wheel in a neutral position, the undeflected beam is directed substantially parallel to a surface supporting the vehicle; orienting the screen by pivoting the deflector so that the 90° deflected beam sweeps across the screen while adjusting the position of the screen in its own plane until the beam defines a line on the screen parallel to a line on the screen; thereafter positioning the deflector so that the 90° deflected beam is directed approximately perpendicular to the screen; thereafter effecting steering movements of the first wheel so that the deflected beam sweeps laterally across the screen and defines a caster line; and recording the angular position of the caster line in relation to the reference line of the screen as the caster angle.

7. A method according to claim 1, including the step of using as the beam projector a laser.

8. A method according to claim 1, including the step of providing as the pin and the bar cylindrical elements of substantially the same diameter.

9. A method according to claim 1 including, after the step of adjusting the screen and prior to the step of pivoting the projector about the axis of the pin, the step of displacing the screen in a direction substantially parallel to the bar.

10. A method according to claim 9, including the steps of: providing a level device on the screen; taking a reading from the level device between the steps of adjusting and displacing the screen, and readjusting the screen immediately after the displacing step until the level device has a reading in conformity with the reading taken before the displacing step.

11. An apparatus for measuring the standard characteristic angles of camber, king pin inclination and caster of one of first and second steerable wheels of a vehicle, comprising: an elongation pin and means for supporting the pin on the outside of the first wheel of the vehicle so that an axis of the pin extends parallel to an axis of rotation of the first wheel; a beam projector having clamping means for supporting it on the pin and having a 90° beam deflector; friction-reducing spacer devices disposed beneath the first and second wheels; a screen provided with a reference line; and a supporting bar which can support the beam projector and means for supporting the bar in the region of the wheels; wherein the screen includes an elongate vertical sheet which can be raised and lowered by supporting means with respect to a foot which rests on a surface beneath the vehicle, includes adjuster means for adjusting the inclination of the sheet in its own plane, includes a pointer which is pivotally supported at a point close to the lower edge of the sheet, extends substantially the entire height of the sheet and can be pivoted to either side from a central zero position so that a portion of the pointer moves along a graduated scale of angular values on the sheet, and includes the pointer having along its entire length a center line which, with the pointer in its central zero position, is the reference line of the screen.

12. An apparatus according to claim 11, wherein the pointer has in said portion thereof an opening extending along the center line of the pointer, through which opening the scale of angular values is visible, including means for releasably locking the pointer in a selected position along the scale, and wherein the scale includes individual graduations for each of the camber angle, king pin inclination angle and caster angle.

13. An apparatus according to claim 11, wherein the first-mentioned pointer pivotally supports two auxiliary pointers positioned symmetrically with respect to the center line of the first-mentioned pointer, the pivot axes for the auxiliary pointers being arranged near the bottom of the first-mentioned pointer close to its own pivot axis on the sheet, wherein the auxiliary pointers each have thereon a straight reference line which extends the entire length thereof and intersects the pivot axis thereof, wherein the auxiliary pointers can be pivoted from respective storage positions extending alongside the first-mentioned pointer to respective extended positions in which their reference lines extend perpendicular to the center line of the first-mentioned pointer, are colinear, and intersect the pivot axis of the first-mentioned pointer so as to define a generally horizontal reference line of approximately the same length as the generally vertical reference line on the first-mentioned pointer.

14. An apparatus according to claim 11, including a scale sheet which can be removably secured on the first-mentioned sheet and which has reference lines which are aligned with the center line on the pointer when the pointer is in its central zero position.

15. An apparatus according to claim 11, wherein said screen includes a separate scale sheet removably and positionally adjustably supported thereon and having thereon the scale of angular values in duplicate, each of the duplicate scales being designed to indicate all three of the front suspensions characteristic angles and each being centrally divided by a center line on the scale sheet which has the zero points of each of the duplicate scales lying thereon; wherein when the pointer is in the central zero position, the scale sheet can be positionally adjusted and secured by clamping means in a position in which the center line of the scale sheet, as observed through a window in the pointer, is aligned with the reference line on the pointer, the three characteristic angles of the first wheel being recorded on one of the duplicate scales and the three characteristic angles of the second wheel being recorded on the other of the duplicate scales.

16. An apparatus according to claim 11, wherein the screen has level means supported on the sheet for pivotal movement about an axis perpendicular to the sheet for providing, in the event of a physical relocation of the screen, an indication of whether the orientation of the sheet within its own plane changed during the relocation.

17. An apparatus according to claim 11, wherein the beam projector is a laser.

18. An apparatus according to claim 11, wherein the sheet has thereon a further reference line which is perpendicular to the first-mentioned reference line thereon.

19. An apparatus according to claim 11, wherein the adjuster means includes a screw which engages a threaded opening in the foot, which engages the surface beneath the foot and which, when rotated, changes the orientation of the foot relative to the surface.

20. A method of measuring a standard characteristic angle of a steerable wheel of a vehicle having longitudinal and transverse axes which are perpendicular, comprising the steps of: placing at a location spaced from said vehicle in a direction parallel to a first of said longitudinal and transverse axes a self-standing portable screen so that a surface on said screen faces said vehicle and is approximately perpendicular to said first axis, said surface having a reference line thereon; orienting a projector which emits a light beam so that the light beam is substantially parallel to said first axis and impinges on said screen; pivoting said projector about a pivot axis substantially parallel to a second of said longitudinal and transverse axes which is different from said first axis while adjusting the angular orientation of said screen about a pivot axis parallel to said first axis until a path of travel of the beam across said screen is parallel to said reference line on said screen; supporting said projector on said wheel so that the beam thereof extends substantially parallel to said first axis and impinges on said screen at a point on said reference line; effecting a selected one of steering movement of said wheel and pivotal movement of said projector about an axis parallel to an axis of rotation of said wheel, a path of travel of the beam across the screen being a measurement line; and recording as said characteristic angle the angle between said measurement line and said reference line on said screen.

* * * * *